United States Patent Office 3,534,458
Patented Oct. 20, 1970

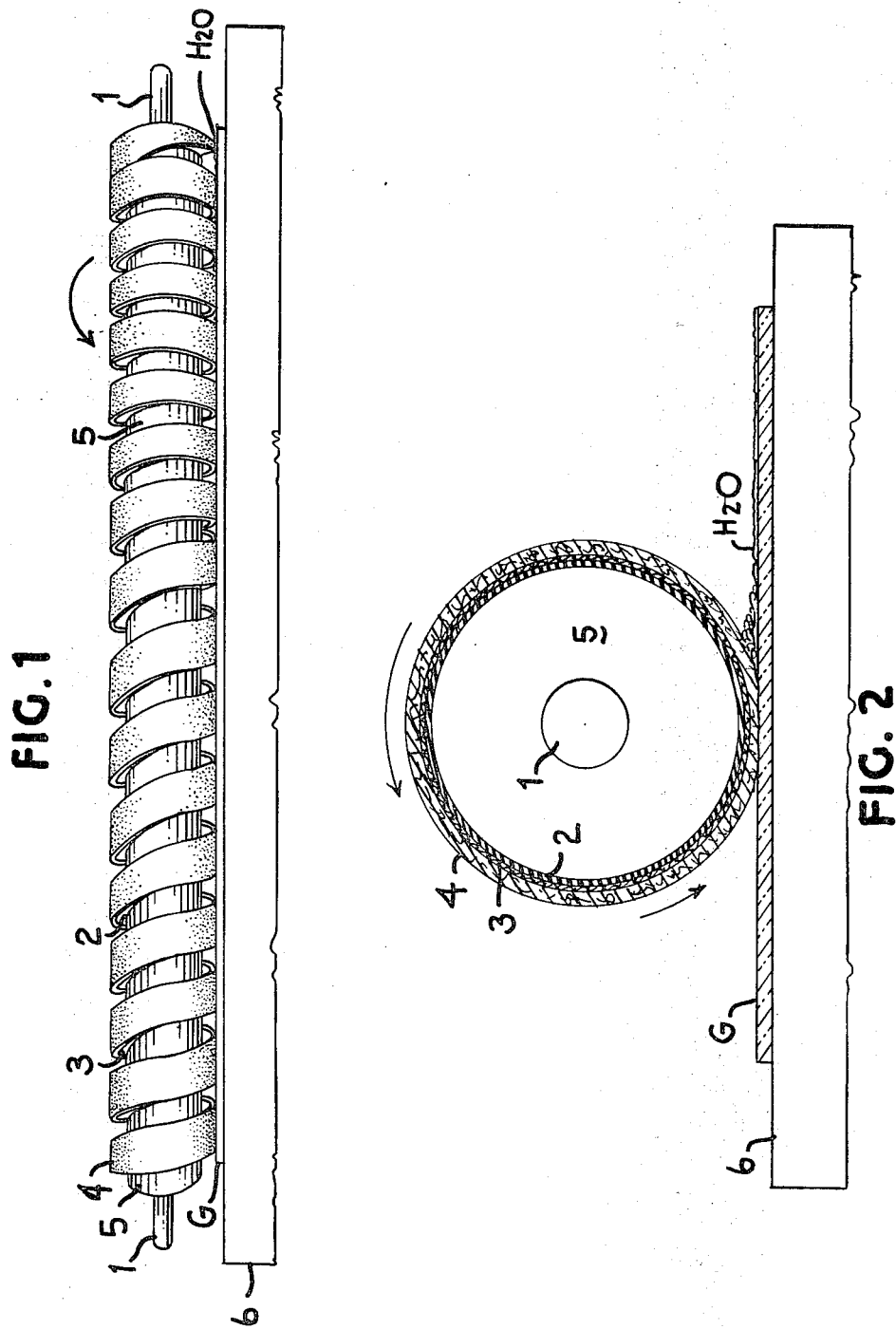

3,534,458
COVERED ROLL
George A. McCrea, Sarver, Pa., assignor to PPG Industries, Inc., a corporation of Pennsylvania
Filed Aug. 18, 1967, Ser. No. 661,716
Int. Cl. C03b *13/16;* B21b *31/08*
U.S. Cl. 29—120
1 Claim

ABSTRACT OF THE DISCLOSURE

A roll for cleaning glass after a hot glass forming operation. A cleaning strip is wound spirally along a solid core. The strip has a rubber base, a fabric second layer, and an outer glass contacting face of felt material.

In a glass forming operation a ribbon of glass advances along a path of travel, and grinding and polishing operations are performed to give the glass acceptable characteristics. Rouge and other abrasive materials are used in the grinding process. Subsequent working and cleaning operations are performed to remove the residue of the grinding. In float glass operations the batch of molten glass is formed upon a metal pool, usually tin. When the glass is formed some tin clings to the surface. The roll removes the tin easily and effectively.

The roll is placed in the processing line under the glass ribbon but is easily moved into contact with the surface of the ribbon. The roll assembly is rotated either with or against the direction of glass ribbon flow.

A description of the roll is given below in conjunction with the drawing wherein:

FIG. 1 shows a perspective view of the assembled roll;
FIG. 2 shows an end view in cross section of the roll of FIG. 1.

Referring to FIG. 1, there is shown a roll having a solid core 3 and positioned on a shaft 1. The core and shaft may be a uniform mass on separate pieces for the purpose of mounting the roll.

A glass contacting surface is put onto the shaft by spirally winding a rubber strip 2 upon the roll.

A layer of fabric, such as canvas 3 is then placed on the rubber.

A felt strip 4 is then adhered to the canvas. The strip is spirally wound along the axis of the roll to provide a wiping effect along the axis of the roll which effect sweeps to the side of the glass. Residual rouge and/or tin enriched glass is easily attached to the roll and swept aside. Water is sprayed onto the roll to facilitate removal of the residue from the glass.

The roll construction with the second layer of canvas provides a bond for the felt. During previous attempts to use a felt roll, the felt separated from the base and same loosened to the detriment of the process.

The combination of a rubber base with a canvas backing strip eliminated the problem of felt separation.

The rotation of the roll provides a sweeping action across the glass.

Adhesive appears to be the best method of fastening the layers of material to the roll and to the cloth.

A suitable positioning device is necessary to move the roll into contact with the glass, and to turn the roll across the glass. Water is supplied to the glass to float away any residue of rouge or tin as the roll sweeps across the glass.

What is claimed is:
1. In a cleaning roll for removing tin from glass formed on a tin pool having an elongated core, an improved cover for the roll comprising
   (a) a strip of rubber helically wound about said core;
   (b) a strip of canvas covering said rubber layer and helically wound about said core; and
   (c) a strip of felt covering said canvas and helically wound about said core, said roll and strips being adhesively bonded together.

References Cited

UNITED STATES PATENTS

| 102,104 | 4/1870 | Forsyth et al. | 29—132 |
| 1,100,090 | 6/1914 | Parker | 29—127 |
| 1,034,830 | 8/1912 | Petin | 15—102 |
| 1,582,882 | 7/1926 | Artas | 15—103 |
| 2,356,411 | 8/1944 | Kuntz | 15—102 |
| 2,807,124 | 9/1957 | Tachon | 15—230.13 |
| 1,147,969 | 7/1915 | Palmer | 161—84 |
| 1,804,139 | 5/1931 | Adsit et al. | 161—84 |
| 2,938,822 | 5/1960 | Nelson | 161—84 |

FOREIGN PATENTS

| 226,487 | 7/1958 | Australia. |
| 401,800 | 6/1933 | Great Britain. |

WALTER A. SCHEEL, Primary Examiner
L. G. MACHLIN, Assistant Examiner

U.S. Cl. X.R.
29—121, 148.4